United States Patent
Nakao et al.

(10) Patent No.: US 11,081,906 B2
(45) Date of Patent: Aug. 3, 2021

(54) CONTACTLESS POWER TRANSMISSION APPARATUS

(71) Applicant: OMRON Corporation, Kyoto (JP)

(72) Inventors: Goro Nakao, Inazawa (JP); Atsushi Nomura, Ichinomiya (JP); Yusuke Kawai, Ichinomiya (JP); Toshiyuki Zaitsu, Yokohama (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/970,511

(22) PCT Filed: Jan. 18, 2019

(86) PCT No.: PCT/JP2019/001543
§ 371 (c)(1),
(2) Date: Aug. 17, 2020

(87) PCT Pub. No.: WO2019/171785
PCT Pub. Date: Sep. 12, 2019

(65) Prior Publication Data
US 2020/0412172 A1 Dec. 31, 2020

(30) Foreign Application Priority Data

Mar. 6, 2018 (JP) .............................. JP2018-039752

(51) Int. Cl.
*H02J 50/12* (2016.01)
*H02J 50/80* (2016.01)
(Continued)

(52) U.S. Cl.
CPC .............. *H02J 50/12* (2016.02); *H01F 38/14* (2013.01); *H02J 50/502* (2020.01); *H02J 50/80* (2016.02); *H01F 2038/146* (2013.01)

(58) Field of Classification Search
CPC .......... H02J 50/12; H02J 50/80; H02J 50/502; H01F 38/14; H01F 2038/146
See application file for complete search history.

(56) References Cited

U.S. PATENT DOCUMENTS

| 2012/0286584 | A1* | 11/2012 | Park | H02J 5/005 307/104 |
| 2012/0326522 | A1* | 12/2012 | Fukushima | H02J 50/12 307/104 |
| 2014/0375253 | A1* | 12/2014 | Leabman | H04B 5/0031 320/108 |

FOREIGN PATENT DOCUMENTS

| JP | 2015-65724 A | 4/2015 |
| WO | 2010/126010 A1 | 11/2010 |

OTHER PUBLICATIONS

English translation of the International Search Report ("ISR") of PCT/JP2019/001543 dated Apr. 16, 2019.
Written Opinion("WO") of PCT/JP2019/001543 dated Apr. 16, 2019.

* cited by examiner

*Primary Examiner* — Jared Fureman
*Assistant Examiner* — Michael J Warmflash
(74) *Attorney, Agent, or Firm* — Metrolex IP Law Group, PLLC

(57) ABSTRACT

A contactless power transmission apparatus includes a receiver that includes a resonant circuit including a receiver coil that receives electric power from a transmitter coil included in a transmitter and a resonant capacitor connected in parallel to the receiver coil. The receiver outputs, through an output coil having fewer turns than the receiver coil and a coil connected to the output coil, electric power received by the resonant circuit and rectifies the output power with a rectifier circuit. The transmitter includes a control circuit that controls a voltage and a switching frequency of alter- (Continued)

nating current power to be supplied to the transmitter coil from a power supply circuit to allow the contactless power transmission apparatus to continuously perform a constant voltage output operation.

2 Claims, 10 Drawing Sheets

(51) Int. Cl.
*H02J 50/50* (2016.01)
*H01F 38/14* (2006.01)

CONTACTLESS POWER TRANSMISSION APPARATUS

FIELD

The present invention relates to a contactless power transmission apparatus.

BACKGROUND

Techniques have been studied for contactless power transmission (also called as wireless power transmission) or transmitting electric power through space without using metal contacts or other connections.

The power transmission efficiency in contactless power transmission is expressed as the product of the degree of coupling k between a primary (transmitter end) coil (hereafter, a transmitter coil) and a secondary (receiver end) coil (hereafter, a receiver coil) and the quality (Q) factor, which is an index of resonance intensity. To improve the power transmission efficiency, the Q factor is to be higher. In particular, when the receiver end receives power through a resonant circuit including a receiver coil and a capacitor that resonate in parallel, power with a higher voltage is transmitted to increase the Q factor.

However, the high voltage may be lowered for use by a load circuit to be driven with power supplied through the resonant circuit on the receiver end. To lower the voltage of supplied power, a DC-DC converter may be provided between the resonant circuit and the load circuit. However, power loss caused by the DC-DC converter lowering the voltage is unintended in some applications. Techniques have been developed for lowering an output voltage without using a DC-DC converter (refer to, for example, Patent Literature 1) by providing, on a receiver end, a resonance reducing circuit that includes a control coil magnetically coupled to a receiver resonant coil to monitor an output voltage. The control coil is switched between a short-circuiting state and an open state with a switch to reduce resonance.

CITATION LIST

Patent Literature

Patent Literature 1: Japanese Unexamined Patent Application Publication No. 2015-65724

SUMMARY

Technical Problem

With the technique described in Patent Literature 1, a contactless power transmission apparatus reduces resonance by switching the control coil between the short-circuiting state and the open state on the receiver end, and may not readily improve the power factor, thus lowering the power transmission efficiency or increasing noise superimposed on transmitted power.

One or more aspects of the present invention are directed to a contactless power transmission apparatus that lowers the voltage of transmitted power and improves power transmission efficiency.

Solution To Problem

A contactless power transmission apparatus according to one aspect of the present invention includes a transmitter and a receiver that receives electric power from the transmitter in a contactless manner. The transmitter includes a transmitter coil that supplies electric power to the receiver, a power supply circuit that supplies alternating current power to the transmitter coil and adjusts a switching frequency and a voltage of the alternating current power to be supplied to the transmitter coil, a first communicator that receives, from the receiver, determination information indicating whether the contactless power transmission apparatus is outputting a constant voltage, and a control circuit that controls the switching frequency and the voltage of the alternating current power to be supplied to the transmitter coil from the power supply circuit in accordance with the determination information. The receiver includes a resonant circuit including a receiver coil that receives electric power from the transmitter and a resonant capacitor connected in parallel to the receiver coil, an output coil located to be electromagnetically coupled to the receiver coil and having fewer turns than the receiver coil, a rectifier circuit that rectifies electric power received through the receiver coil and output from the output coil, a coil connected between the output coil and the rectifier circuit, a voltage detection circuit that measures an output voltage of electric power output from the rectifier circuit and determines a measurement value of the output voltage, a second communicator that communicates with the first communicator, and a determination circuit that determines whether the contactless power transmission apparatus is outputting a constant voltage in accordance with the measurement value of the output voltage and causes the second communicator to transmit a signal including the determination information.

The contactless power transmission apparatus according to the above aspect of the present invention has the above structure to lower the voltage of transmitted power and improve power transmission efficiency.

In the contactless power transmission apparatus, the rectifier circuit in the receiver may be a synchronous rectifier circuit.

The contactless power transmission apparatus thus reduces power loss caused by the rectifier circuit and thus improves power transmission efficiency.

DETAILED DESCRIPTION

A contactless power transmission apparatus according to one embodiment of the present invention will now be described with reference to the drawings. In the contactless power transmission apparatus, a receiver end device includes a resonant circuit in which a receiver coil and a capacitor resonate in parallel and an output coil for outputting power located to be electromagnetically coupled to the receiver coil. The contactless power transmission apparatus includes the output coil separate from the resonant circuit and having fewer turns than the receiver coil to output received power. The contactless power transmission apparatus thus lowers the voltage of transmitted power and improves the quality (Q) factor. The contactless power transmission apparatus further includes a coil connected in series to the output coil between the output coil and a load circuit to perform a constant voltage output operation, and adjusts a voltage applied to the transmitter coil and its frequency to enable a transmitter end to output a constant voltage. The contactless power transmission apparatus thus improves the power factor and the power transmission efficiency.

Figure 1:
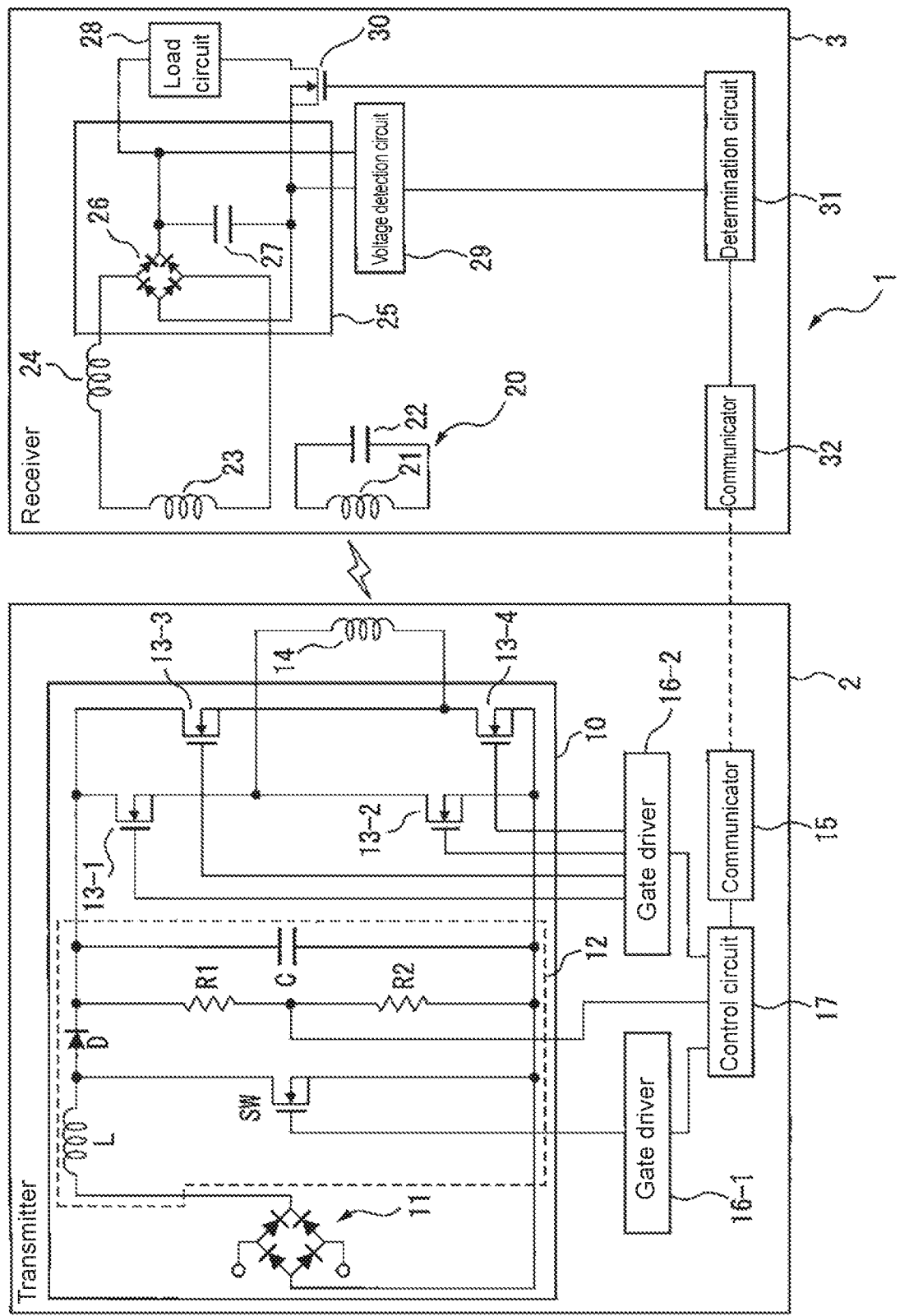
FIG. 1 is a schematic diagram of a contactless power transmission apparatus according to one embodiment of the present invention.

FIG. 1 is a schematic diagram of a contactless power transmission apparatus according to one embodiment of the present invention. As shown in FIG. 1, a contactless power transmission apparatus 1 includes a transmitter 2, and a receiver 3 for receiving power from the transmitter 2 through space in a contactless manner. The transmitter 2 includes a power supply circuit 10, a transmitter coil 14, a communicator 15, gate drivers 16-1 and 16-2, and a control circuit 17. The receiver 3 includes a resonant circuit 20 including a receiver coil 21 and a resonant capacitor 22, an output coil 23, a coil 24, a rectifier-smoothing circuit 25, a load circuit 28, a voltage detection circuit 29, a switching element 30, a determination circuit 31, and a communicator 32.

The transmitter 2 will now be described.

The power supply circuit 10 supplies alternating current (AC) power having an adjustable switching frequency and an adjustable voltage to the transmitter coil 14. The power supply circuit 10 thus includes a power source 11, a power factor correction circuit 12, and four switching elements 13-1 to 13-4.

The power source 11 supplies power having a predetermined pulsating voltage. The power source 11 is thus connected to a utility AC power source, and includes a full wave rectifier circuit for rectifying AC power supplied from the utility AC power source.

The power factor correction circuit 12 converts the voltage of power output from the power source 11 to a voltage corresponding to control by the control circuit 17 and outputs the resultant voltage. The power factor correction circuit 12 thus includes, for example, a coil L and a diode D that are connected in series in this order from the positive electrode terminal of the power source 11, a switching element SW, which is an n-channel metal-oxide-semiconductor field-effect transistor (MOSFET) having a drain terminal connected between the coil L and the diode D and a source terminal connected to the negative electrode terminal of the power source 11, and a smoothing capacitor C connected in parallel to the switching element SW across the diode D. The switching element SW has a gate terminal connected to the gate driver 16-1. The power factor correction circuit 12 includes two resistors R1 and R2 connected in series between the positive electrode terminal and the negative electrode terminal of the power source 11. The resistors R1 and R2 are connected in parallel to the smoothing capacitor C between the diode D and the smoothing capacitor C. The voltage across the resistors R1 and R2 is measured by the control circuit 17 as a voltage output from the diode D.

The gate driver 16-1 controls the on-off state of the switching element SW in accordance with a duty ratio indicated by the control circuit 17 to allow the waveform of the current output from the diode D to have the same path as the voltage supplied from the power source 11. The power factor correction circuit 12 thus performs power factor correction. As the duty ratio causing the on state of the switching element SW is higher, the diode D outputs a higher voltage.

The voltage output from the diode D is smoothed by the smoothing capacitor C and supplied to the transmitter coil 14 through the four switching elements 13-1 to 13-4.

The power factor correction circuit 12 is not limited to the above structure and may have another structure to output a voltage adjustable as controlled by the control circuit 17.

The four switching elements 13-1 to 13-4 are, for example, n-channel MOSFETs. Of the four switching elements 13-1 to 13-4, the switching elements 13-1 to 13-2 are connected in series between the positive electrode terminal and the negative electrode terminal of the power source 11 through the power factor correction circuit 12. In the present embodiment, the power source 11 has the positive electrode connected to the switching element 13-1 and the negative electrode connected to the switching element 13-2. The switching element 13-1 has a drain terminal connected to the positive electrode terminal of the power source 11 through the power factor correction circuit 12 and a source terminal connected to the drain terminal of the switching element 13-2. The switching element 13-2 has a source terminal connected to the negative electrode terminal of the power source 11 through the power factor correction circuit 12. The source terminal of the switching element 13-1 and the drain terminal of the switching element 13-2 are connected to one end of the transmitter coil 14, and the source terminal of the switching element 13-2 is connected to the other end of the transmitter coil 14 through the switching element 13-4.

Of the four switching elements 13-1 to 13-4, similarly, the switching elements 13-3 and 13-4 are connected in parallel to the switching elements 13-1 and 13-2 and in series to each other between the positive electrode terminal and the negative electrode terminal of the power source 11 through the power factor correction circuit 12. The power source 11 has the positive electrode connected to the switching element 13-3 and the negative electrode connected to the switching element 13-4. The switching element 13-3 has a drain terminal connected to the positive electrode terminal of the power source 11 through the power factor correction circuit 12 and a source terminal connected to the drain terminal of the switching element 13-4. The switching element 13-4 has a source terminal connected to the negative electrode terminal of the power source 11 through the power factor correction circuit 12. The source terminal of the switching element 13-3 and the drain terminal of the switching element 13-4 are connected to the other end of the transmitter coil 14.

The switching elements 13-1 to 13-4 have their gate terminals connected to the control circuit 17 through the gate driver 16-2. Each of the switching elements 13-1 to 13-4 may have its gate terminal connected to its source terminal through a resistor to be reliably turned on in response to a voltage for turning on the switching element. The switching elements 13-1 to 13-4 are turned on and off in response to a control signal from the control circuit 17 at an adjustable switching frequency. In the present embodiment, a pair of the switching elements 13-1 and 13-4 and a pair of the switching elements 13-2 and 13-3 are alternately turned on and off to allow the switching elements 13-2 and 13-3 to be off while the switching elements 13-1 and 13-4 are on, and the switching elements 13-1 and 13-4 to be off while the switching elements 13-2 and 13-3 are on. This allows direct current (DC) power supplied from the power source 11 through the power factor correction circuit 12 to be converted into AC power with the switching frequency of the switching elements and supplied to the transmitter coil 14.

The transmitter coil 14 transmits, through space, AC power supplied from the power supply circuit 10 to the resonant circuit 20 in the receiver 3.

The communicator 15 extracts, from every radio signal received from the communicator 32 in the receiver 3, determination information indicating, for example, whether the contactless power transmission apparatus 1 is outputting a constant voltage, and outputs the information to the control circuit 17. To communicate with the communicator 32 in the receiver 3, the communicator 15 includes, for example, an antenna that receives a radio signal in accordance with a predetermined wireless communication standard and a communication circuit that demodulates the radio signal. The predetermined wireless communication standard is, for example, ISO/IEC 15693, ZigBee (registered trademark), or Bluetooth (registered trademark).

The gate driver 16-1 receives, from the control circuit 17, a control signal for turning on and off the switching element SW in the power factor correction circuit 12, and changes a voltage to be applied to the gate terminal of the switching element SW in response to the control signal. More specifically, when receiving a control signal for turning on the switching element SW, the gate driver 16-1 applies a relatively high voltage to the gate terminal of the switching element SW to turn on the switching element SW. When receiving a control signal for turning off the switching element SW, the gate driver 16-1 applies a relatively low voltage to the gate terminal of the switching element SW to turn off the switching element SW. This allows the gate driver 16-1 to turn on and off the switching element SW in the power factor correction circuit 12 at timing specified by the control circuit 17.

The gate driver 16-2 receives a control signal for turning on and off each of the switching elements 13-1 to 13-4 from the control circuit 17, and changes the voltage to be applied to the gate terminal of each of the switching elements 13-1 to 13-4 in response to the control signal. More specifically, when receiving a control signal for turning on the switching elements 13-1 and 13-4, the gate driver 16-2 applies a relatively high voltage to the gate terminals of the switching elements 13-1 and 13-4 to turn on the switching elements 13-1 and 13-4. This allows a current from the power source 11 to flow through the switching element 13-1, the transmitter coil 14, and the switching element 13-4. When receiving a control signal for turning off the switching elements 13-1 and 13-4, the gate driver 16-2 applies a relatively low voltage to the gate terminals of the switching elements 13-1 and 13-4 to turn off the switching elements 13-1 and 13-4 and prevent the current from the power source 11 from flowing through the switching elements 13-1 and 13-4. The gate driver 16-2 controls a voltage to be applied to the gate terminals of the switching elements 13-2 and 13-3 in the same manner. When the switching elements 13-1 and 13-4 are off and the switching elements 13-2 and 13-3 are on, the current from the power source 11 flows through the switching element 13-3, the transmitter coil 14, and the switching element 13-2.

The control circuit 17 includes, for example, nonvolatile and volatile memory circuits, an arithmetic circuit, and an interface circuit for connection to another circuit. Upon every reception of determination information from the communicator 15, the control circuit 17 controls the switching frequency and the voltage of AC power supplied from the power supply circuit 10 to the transmitter coil 14 in accordance with the determination information.

In the present embodiment, the control circuit 17 controls the pair of switching elements 13-1 and 13-4 and the pair of switching elements 13-2 and 13-3 to be alternately turned on for the same duration within one cycle corresponding to the switching frequency. To prevent the pair of switching elements 13-1 and 13-4 and the pair of switching elements 13-2 and 13-3 from being turned on at the same time and short-circuiting the power source 11, the control circuit 17 may have dead time during which both the pairs of switching elements are off when turning them on and off.

The control circuit 17 selects a duty ratio corresponding to a switching frequency by referring to a reference table indicating the correspondence between each switching frequency and the duty ratio that controls the on-off state of the switching element SW in the power factor correction circuit 12 to enable a constant voltage output at the corresponding switching frequency for a voltage applied to the transmitter coil 14. The control circuit 17 determines the timing of turning on and off the switching element SW in accordance with the duty ratio and the change in the output voltage from the diode D in the power factor correction circuit 12, and outputs a control signal indicating the timing to the gate driver 16-1.

When the communicator 15 receives no radio signal from the receiver 3, the receiver 3 may be located outside the range for receiving power from the transmitter 2, or in other words, the transmitter 2 may be in a standby state. In this case, the control circuit 17 may set the duty ratio for controlling the on-off state of the switching element SW to its minimum possible value. During the standby state of the transmitter 2, the minimum possible voltage is applied to the transmitter coil 14 to reduce energy loss.

The control of the switching frequency and the voltage applied to the transmitter coil 14 performed by the control circuit 17 will be described in detail later.

The receiver 3 will now be described.

The resonant circuit 20 is an LC resonant circuit including the receiver coil 21 and the resonant capacitor 22 connected in parallel to each other.

The receiver coil 21 resonates with an AC flowing through the transmitter coil 14 in the transmitter 2 to receive power from the transmitter coil 14. The received power is output through the output coil 23 located to be electromagnetically coupled to the receiver coil 21. The receiver coil 21 and the transmitter coil 14 in the transmitter 2 may have the same number or different numbers of turns.

The resonant capacitor 22 has one end connected to one end of the receiver coil 21 and the other end connected to the other end of the receiver coil 21. The resonant capacitor 22 forms a resonant circuit together with the receiver coil 21 to resonate in parallel to receive power transmitted from the transmitter coil 14.

The output coil 23 is located to be electromagnetically coupled to the receiver coil 21 in the resonant circuit 20. For example, the output coil 23 and the receiver coil 21 are wound around the same core wire. The output coil 23 thus forms a transformer together with the receiver coil 21, allowing power received by the receiver coil 21 to be output from the output coil 23. The output coil 23 has one end connected to one input terminal of the rectifier-smoothing circuit 25 through the coil 24. The output coil 23 also has the other end connected to the other input terminal of the rectifier-smoothing circuit 25. The power output from the output coil 23 is supplied to the load circuit 28 though the coil 24 and the rectifier-smoothing circuit 25.

Figure 2:
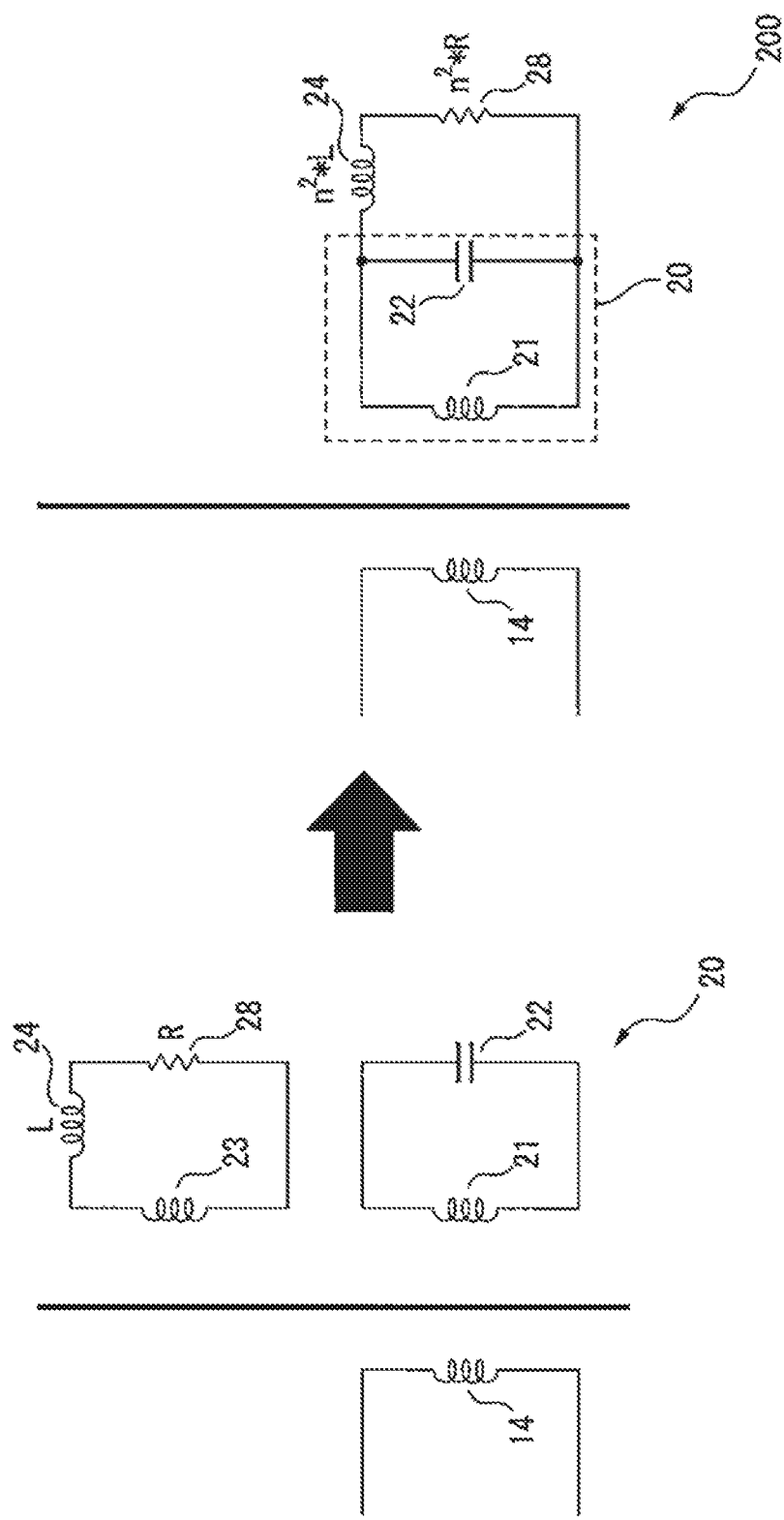
FIG. 2 is an equivalent circuit diagram of a resonant circuit, an output coil, and a coil connected to the output coil.

FIG. 2 is an equivalent circuit diagram of the resonant circuit 20, the output coil 23, and the coil 24. As shown in an equivalent circuit 200, the receiver coil 21 in the resonant circuit 20 and the output coil 23 operate as a transformer, and thus the resonant circuit 20, the output coil 23, and the coil 24 operate in a manner equivalent to a circuit in which the coil 24 is connected between one end of the resonant circuit 20 and one end of the load circuit 28 and the other end of the resonant circuit 20 is connected to the other end of the load circuit 28.

When the receiver coil 21 and the resonant capacitor 22 resonate in parallel as in the resonant circuit 20, the equivalent circuit 200 has a Q factor written with the formula below.

Formula 1

$$Q = R_e \sqrt{\frac{C_e}{L_e}} \quad (1)$$

where Ce is the capacity of the equivalent circuit 200, Le is the inductance of the equivalent circuit 200, and Re is the resistance of the equivalent circuit 200. When the ratio of the number of turns of the receiver coil 21 in the resonant circuit 20 to the number of turns of the output coil 23 is 1:n, the inductance of the coil 24 is L, and the resistance of the load circuit 28 is R, the equivalent inductance of the coil 24 is $n^2*L$, and the equivalent resistance of the load circuit 28 is $n^2*R$ in the equivalent circuit 200. To evaluate the Q factor for the resistance of the actual load circuit 28, the resistance Re is $n^2*R$. The voltage of power output from the output coil 23 is 1/n of the voltage of power received by the resonant circuit 20. Further, the voltage of the power output from the output coil 23 is to be R*I, where I is a current flowing through the load circuit 28. The voltage output from the output coil 23 is thus proportional to the resistance of the load circuit 28. Thus, with n larger than 1, the Q factor can be higher although the output power voltage is low. In the present embodiment, the output coil 23 thus has fewer turns than the receiver coil 21.

The coil 24 is connected between the resonant circuit 20 and the rectifier-smoothing circuit 25. In the present embodiment, the coil 24 has one end connected to the output coil 23 and the other end connected to the rectifier-smoothing circuit 25 to be in series to the output coil 23. The coil 24 outputs power from the output coil 23 to the rectifier-smoothing circuit 25. The coil 24 reduces harmonic components included in the received power.

The rectifier-smoothing circuit 25, which is an example of a rectifier circuit, includes a full wave rectifier circuit 26 including four bridge-connected diodes and a smoothing capacitor 27. The rectifier-smoothing circuit 25 rectifies and smooths the power received through the resonant circuit 20 and output through the output coil 23 and the coil 24 to convert the power to DC power. The rectifier-smoothing circuit 25 outputs the DC power to the load circuit 28.

The voltage detection circuit 29 measures the output voltage across the rectifier-smoothing circuit 25 at predetermined intervals. The output voltage across the rectifier-smoothing circuit 25 corresponds one-to-one to the output voltage of the output coil 23. The measurement value of the output voltage across the rectifier-smoothing circuit 25 thus indirectly represents the measurement value of the output voltage of the output coil 23. The voltage detection circuit 29 may be any of known voltage detection circuits that can detect a DC voltage. The voltage detection circuit 29 outputs a voltage detection signal indicating the measurement value of the output voltage to the determination circuit 31.

The switching element 30 is, for example, a MOSFET and is connected between the rectifier-smoothing circuit 25 and the load circuit 28. The switching element 30 does not allow a current to flow from the rectifier-smoothing circuit 25 to the load circuit 28 in the off state and allows a current to flow from the rectifier-smoothing circuit 25 to the load circuit 28 in the on state.

The determination circuit 31 determines whether the measurement value of the output voltage received from the voltage detection circuit 29 is within the allowable range of voltages during a constant voltage output operation. The determination circuit 31 provides the determination result to the communicator 32. The allowable range of voltages may have an upper limit set equal to or lower than the upper limit of the threshold.

The determination circuit 31 thus includes, for example, a memory circuit that stores the allowable range of voltages, an arithmetic circuit that compares the measurement value of the output voltage with the allowable range of voltages, and a control circuit that controls the on-off state of the switching element 30.

The determination circuit 31 turns on and off the switching element 30 at predetermined intervals while the measurement value of the output voltage is out of the allowable range of voltages. This changes the resistance of the entire circuit including the load circuit 28 connected to the rectifier-smoothing circuit 25 at the predetermined intervals. The determination circuit 31 can thus determine whether the contactless power transmission apparatus 1 is outputting a constant voltage by determining whether the measurement value of the output voltage remains substantially constant while turning on and off the switching element 30. The determination circuit 31 notifies the communicator 32 that the contactless power transmission apparatus 1 is outputting a constant voltage when the measurement value of the output voltage remains substantially constant while the switching element 30 is being turned on and off at the predetermined intervals.

When the measurement value of the output voltage indicates that the contactless power transmission apparatus 1 is outputting a constant voltage for a predetermined period longer than a predetermined interval, the determination circuit 31 stops turning on and off the switching element 30 and retains the on state. The determination circuit 31 determines whether the measurement value of the output voltage is within the allowable range of voltages and provides the determination result to the communicator 32.

When the measurement value of the output voltage is within the allowable range of voltages for a predetermined period longer than the predetermined interval, the determination circuit 31 provides, to the communicator 32, the determination result indicating that the contactless power transmission apparatus 1 is outputting a constant voltage and the measurement value of the output voltage is within the allowable range of voltages.

In one modification, the determination circuit 31 may include a resistor connected in parallel to the load circuit 28 to the rectifier-smoothing circuit 25. In this case, the switching element 30 may be connected in series to the resistor and in parallel to the load circuit 28. The determination circuit 31 turns off the switching element 30 while the measurement value of the output voltage is within the allowable range of voltages. When the measurement value of the output voltage is out of the allowable range of voltages, the determination circuit 31 turns on and off the switching element 30 at the predetermined intervals in the same manner as in the above embodiment. In this modification, the load circuit 28 continuously receives power while the contactless power transmission apparatus 1 is not outputting a constant voltage.

In another modification, a second switching element, such as a MOSFET, may be connected in parallel to the above resistor and in series to the load circuit 28. In this case, while the measurement value of the output voltage is within the allowable range of voltages, the determination circuit 31 retains the on state of the second switching element to supply power to the load circuit 28. When the measurement value of the output voltage is out of the allowable range of voltages, the determination circuit 31 may turn off the second switching element to stop supplying power to the load circuit 28. This structure prevents an excessively high voltage from being applied to the load circuit 28 although the voltage of received power rises excessively during adjustment of the switching frequency in the transmitter 2.

The communicator 32 generates, in accordance with the determination result received from the determination circuit 31, a radio signal including determination information indicating whether the contactless power transmission apparatus 1 is outputting a constant voltage and the measurement value of the output voltage is within the allowable range of voltages at predetermined transmission intervals, and transmits the radio signal toward the communicator 15 in the transmitter 2. The communicator 32 thus includes, for example, a communication circuit that generates a radio signal in accordance with a predetermined wireless communication standard and an antenna that outputs the radio signal to communicate with the communicator 15 in the transmitter 2. As in the communicator 15, the predetermined wireless communication standard is, for example, ISO/IEC 15693, ZigBee (registered trademark), or Bluetooth (registered trademark).

The operation of the contactless power transmission apparatus 1 will be described in detail.

In the present embodiment, the control circuit 17 in the transmitter 2 adjusts, based on the determination information received from the communicator 15, the switching frequency and the voltage of AC power supplied to the transmitter coil 14 from the power supply circuit 10 to allow the contactless power transmission apparatus 1 to continuously perform a constant voltage output operation.

The contactless power transmission apparatus 1 according to the present embodiment does not use resonance on the transmitter end. The frequency response of the output voltage from the contactless power transmission apparatus 1 thus resembles the frequency response of the output voltage for the increased capacitance of the capacitor connected in series to the transmitter coil and the lowered resonance frequency of the resonant circuit on the transmitter end in a contactless power transmission apparatus 1 operating on the SPL topology including a reactor connected in series to the coil in the resonant circuit on the receiver end.

Figure 3:
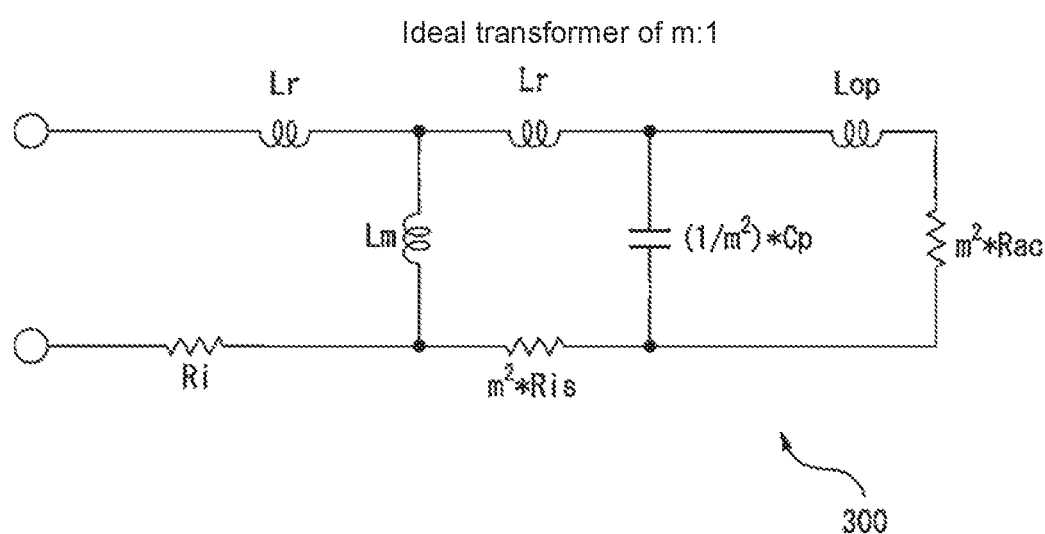
FIG. 3 is an equivalent circuit diagram of the contactless power transmission apparatus.

FIG. 3 is an equivalent circuit diagram of the contactless power transmission apparatus 1. In an equivalent circuit 300, the transmitter coil 14 on the transmitter end and the receiver coil 21 in the resonant circuit 20 on the receiver end are coupled to form an ideal transformer of m:1. In this circuit, Lr is the leakage inductance of the transmitter coil 14 on the transmitter end, and Lm is the magnetizing inductance of the transmitter coil 14. The inductance Lp of the transmitter coil 14 on the transmitter end is equal to (Lm+Lr), and Lr=(1−k)Lp and Lm=kLp, where k is the degree of coupling between the transmitter coil 14 and the receiver coil 21. Ri is the coil resistance on the transmitter end, and Ris is the coil resistance on the receiver end. Cp is the capacitance of the resonant capacitor 22 connected in parallel to the receiver coil 21 in the resonant circuit 20 on the receiver end. Lop is the inductance of the coil 24 connected in series to the receiver coil 21. Rac is the AC equivalent resistance of the load circuit 28, and Rac=$(8/\pi^2) \times (n^2 \times Ro)$, Ro is the resistance of the load circuit 28, and n is the ratio of the number of turns of the receiver coil 21 to the number of turns of the output coil 23.

Figure 4:
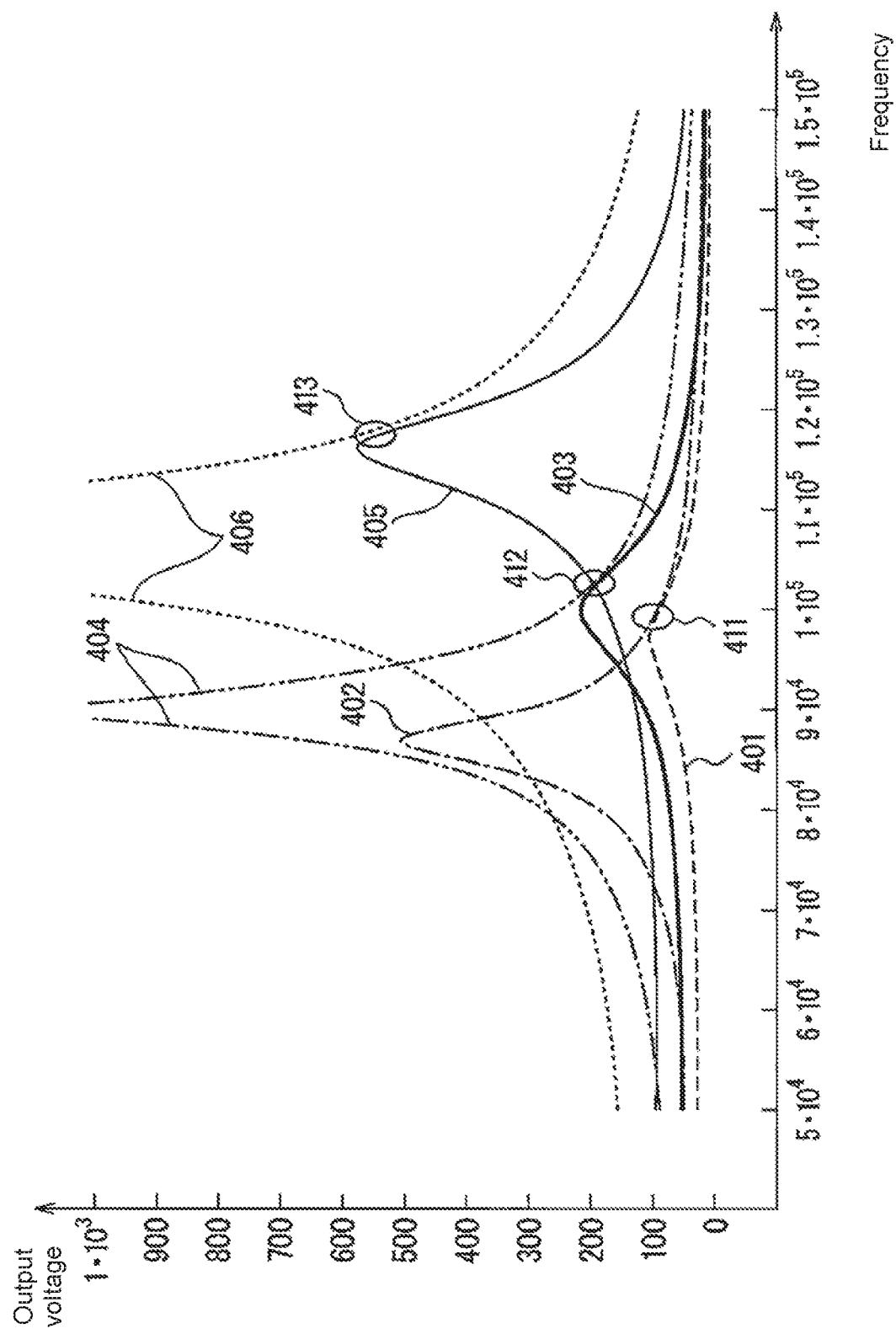
FIG. 4 is a graph showing example simulation results for the frequency response of the output voltage from the contactless power transmission apparatus according to the embodiment.

FIG. 4 is a graph showing example simulation results for the frequency response of the output voltage from the contactless power transmission apparatus 1 according to the present embodiment. In FIG. 4, the horizontal axis represents the frequency, and the vertical axis represents the output voltage. In this simulation, Lp=174 μH, Cp=20 nF, Lop=3 Lp, Ri=Ris=0.3Ω, n=1, Vin=200 V, and Rac=162.1Ω. A line 401 represents the frequency response of the output voltage for the degree of coupling k=0.15 and the AC equivalent resistance of the load circuit 28 being Rac. A line 402 represents the frequency response of the output voltage for the degree of coupling k=0.15 and the AC equivalent resistance of the load circuit 28 being (10*Rac). A line 403 represents the frequency response of the output voltage for the degree of coupling k=0.3 and the AC equivalent resistance of the load circuit 28 being Rac. A line 404 represents the frequency response of the output voltage for the degree of coupling k=0.3 and the AC equivalent resistance of the load circuit 28 being (10*Rac). A line 405 represents the frequency response of the output voltage for the degree of coupling k=0.6 and the AC equivalent resistance of the load circuit 28 being Rac. A line 406 represents the frequency response of the output voltage for the degree of coupling k=0.6 and the AC equivalent resistance of the load circuit 28 being (10*Rac).

As shown in FIG. 4, the graph includes, for each degree of coupling k (at three plots 411 to 413 in the figure), the combination of the frequency and the output voltage that causes an output voltage to be substantially constant (or a constant voltage output) against a varying AC equivalent resistance of the load circuit 28 under the constant degree of coupling k. This reveals that the contactless power transmission apparatus 1 can output a constant voltage for a varying resistance of the load circuit 28 although AC power with a switching frequency that cannot resonate with the transmitter coil 14 is applied to the transmitter coil 14. Further, although the output voltage being constant against a varying resistance of the load circuit 28 differs depending on the degree of coupling k as indicated at the plots 411 to 413, adjusting the voltage applied to the transmitter coil 14 can eliminate this difference in the output voltage and enable the output voltage to be substantially constant at any degree of coupling.

Figure 5:
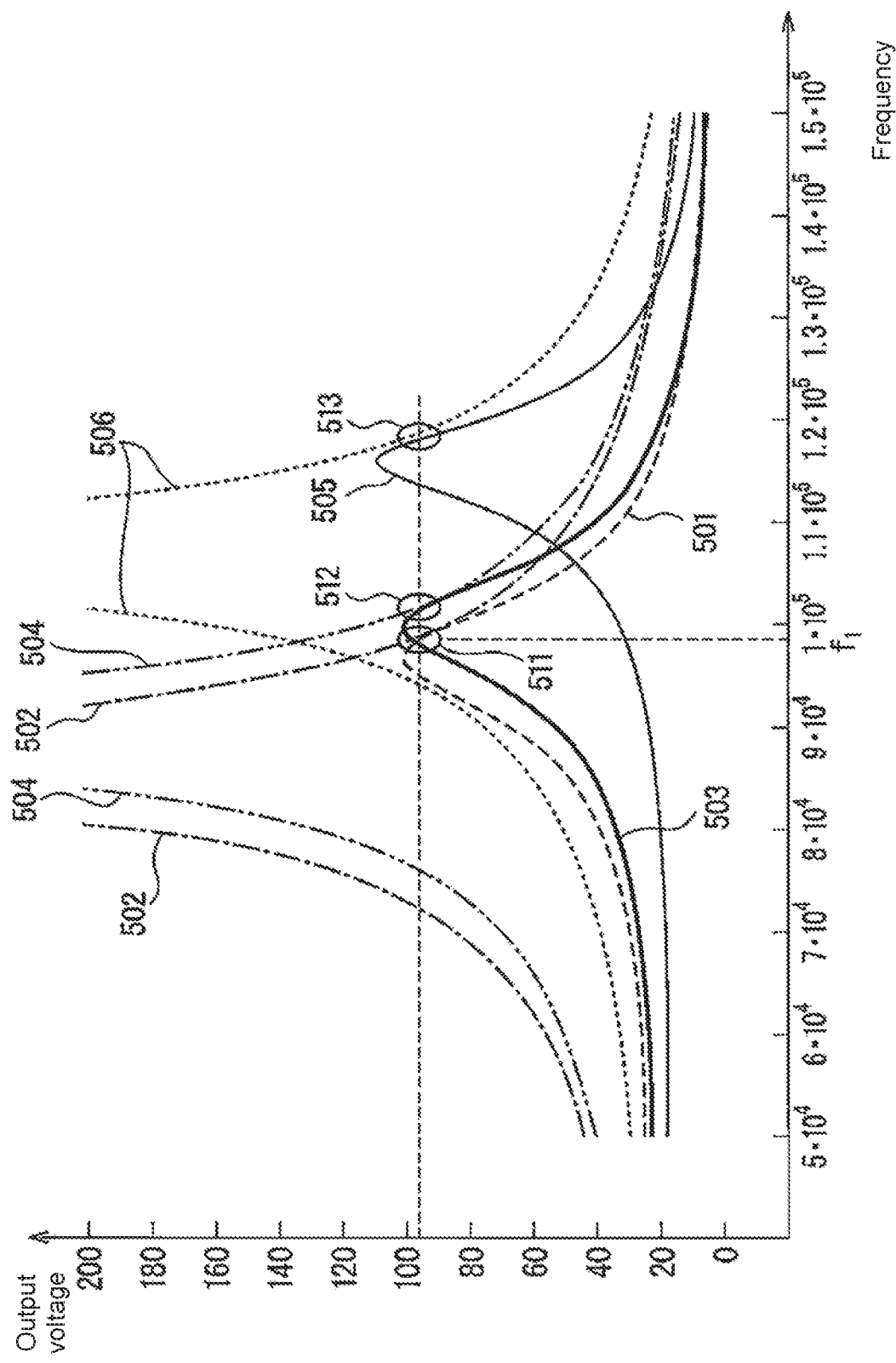
FIG. 5 is a graph showing example simulation results for the frequency response of the output voltage for a varying voltage applied to a transmitter coil in accordance with the degree of coupling in the simulation shown in FIG. 4.

FIG. 5 is a graph showing example simulation results for the frequency response of the output voltage for a varying voltage applied to the transmitter coil 14 in accordance with the degree of coupling in the simulation shown in FIG. 4. In FIG. 5, the horizontal axis represents the frequency, and the vertical axis represents the output voltage. A line 501 represents the frequency response of the output voltage for the degree of coupling k=0.15, the AC equivalent resistance of the load circuit 28 being Rac, and a voltage applied to a transmitter coil being Vin. A line 502 represents the frequency response of the output voltage for the degree of coupling k=0.15, the AC equivalent resistance of the load circuit 28 being (10*Rac), and a voltage applied to a transmitter coil being Vin. A line 503 represents the frequency response of the output voltage for the degree of coupling k=0.3, the AC equivalent resistance of the load circuit 28 being Rac, and a voltage applied to a transmitter coil being (0.47*Vin). A line 504 represents the frequency response of the output voltage for the degree of coupling k=0.3, the AC equivalent resistance of the load circuit 28 being (10*Rac), and a voltage applied to a transmitter coil being (0.47*Vin). A line 505 represents the frequency response of the output voltage for the degree of coupling k=0.6, the AC equivalent resistance of the load circuit 28 being Rac, and a voltage applied to a transmitter coil being (0.19*Vin). A line 506 represents the frequency response of the output voltage for the degree of coupling k=0.6, the AC equivalent resistance of the load circuit 28 being (10*Rac), and a voltage applied to a transmitter coil being (0.19*Vin).

The combinations of the frequency and the output voltage at three plots 511 to 513 correspond to the combinations at the three plots 411 to 413 shown in FIG. 4 that cause an output voltage to be substantially constant (or a constant voltage output) against a varying AC equivalent resistance of the load circuit 28 under the constant degree of coupling k. The output voltages at the plots 511 to 513 are substantially equal to one another.

This reveals that appropriately adjusting the switching frequency and the voltage of the AC power applied to the transmitter coil 14 enables the output voltage to remain substantially constant independently of the varying resistance of the load circuit 28 or the varying degree of coupling.

To enable such a constant voltage output operation, the control circuit 17 controls the switching frequency and the voltage of the AC power to be applied to the transmitter coil 14 in the manner described below.

When the determination information included in the radio signal received from the receiver 3 through the communicator 15 indicates that the contactless power transmission apparatus 1 is not outputting a constant voltage, the control circuit 17 changes the switching frequency of the AC power within a predetermined frequency range. The predetermined frequency range ranges from the frequency at which a constant voltage is output with an estimated minimum degree of coupling between the transmitter coil 14 and the receiver coil 21 to the frequency at which a constant voltage is output with an estimated maximum degree of coupling between the transmitter coil 14 and the receiver coil 21 when, for example, the transmitter 2 transmits power to the receiver 3.

When changing the switching frequency, the control circuit 17 may increase or decrease the switching frequency sequentially from the lower limit to the upper limit of the predetermined frequency range or from the upper limit to the lower limit of the predetermined frequency range. To allow the determination circuit 31 in the receiver 3 to determine whether the output voltage is substantially constant, the control circuit 17 may change the switching frequency in steps to retain the constant switching frequency for longer than the interval at which the determination circuit 31 turns on and off the switching element 30.

The control circuit 17 may lower the voltage applied to the transmitter coil 14 to the lowest while adjusting the switching frequency. This prevents power with an excessively high voltage from being supplied to the receiver 3.

When the determination information included in the radio signal received from the receiver 3 through the communicator 15 indicates that the measurement value of the output voltage is out of the allowable range of voltages but remains substantially constant against a varying resistance of the load circuit 28, or more specifically, a constant voltage output operation is being performed, the control circuit 17 thereafter retains the constant switching frequency. The control circuit 17 selects the duty ratio by referring to the reference table indicating the correspondence between each switching frequency and the duty ratio that controls the on-off state of the switching element SW in the power factor correction circuit 12 to enable a constant voltage output at the corresponding switching frequency at any degree of coupling. The control circuit 17 controls the gate driver 16-1 to turn on and off the switching element SW in the power factor correction circuit 12 in accordance with the duty ratio. Thus, the voltage to be applied to the transmitter coil 14 is adjusted to allow the output voltage from the output coil 23 to be within the allowable range of voltages, or more specifically, to allow a constant voltage to be output at any degree of coupling. When the determination information included in the radio signal received from the receiver 3 through the communicator 15 indicates that the measurement value of the output voltage is within the allowable range of voltages, the control circuit 17 retains the constant switching frequency and the constant voltage of AC power supplied to the transmitter coil 14.

The control circuit 17 may gradually change the duty ratio until the determination information included in the radio signal received from the receiver 3 through the communicator 15 indicates that the measurement value of the output voltage is within the allowable range of voltages, instead of referring to the above reference table and selecting the duty ratio.

To improve energy transmission efficiency, the power supply circuit 10 and the transmitter coil 14 in the transmitter 2 may continuously perform a soft-switching (inductive) operation. To allow the power supply circuit 10 and the transmitter coil 14 to perform the soft-switching operation, the phase of the current flowing through the transmitter coil 14 may be delayed relative to the phase of the voltage applied to the transmitter coil 14. Thus, when, for example, the switching elements 13-1 and 13-4 are turned on, a current flows from the source terminal to the drain terminal of the switching element 13-1, thus causing the power supply circuit 10 and the transmitter coil 14 to perform the soft-switching operation and reducing the switching loss.

Figure 6:
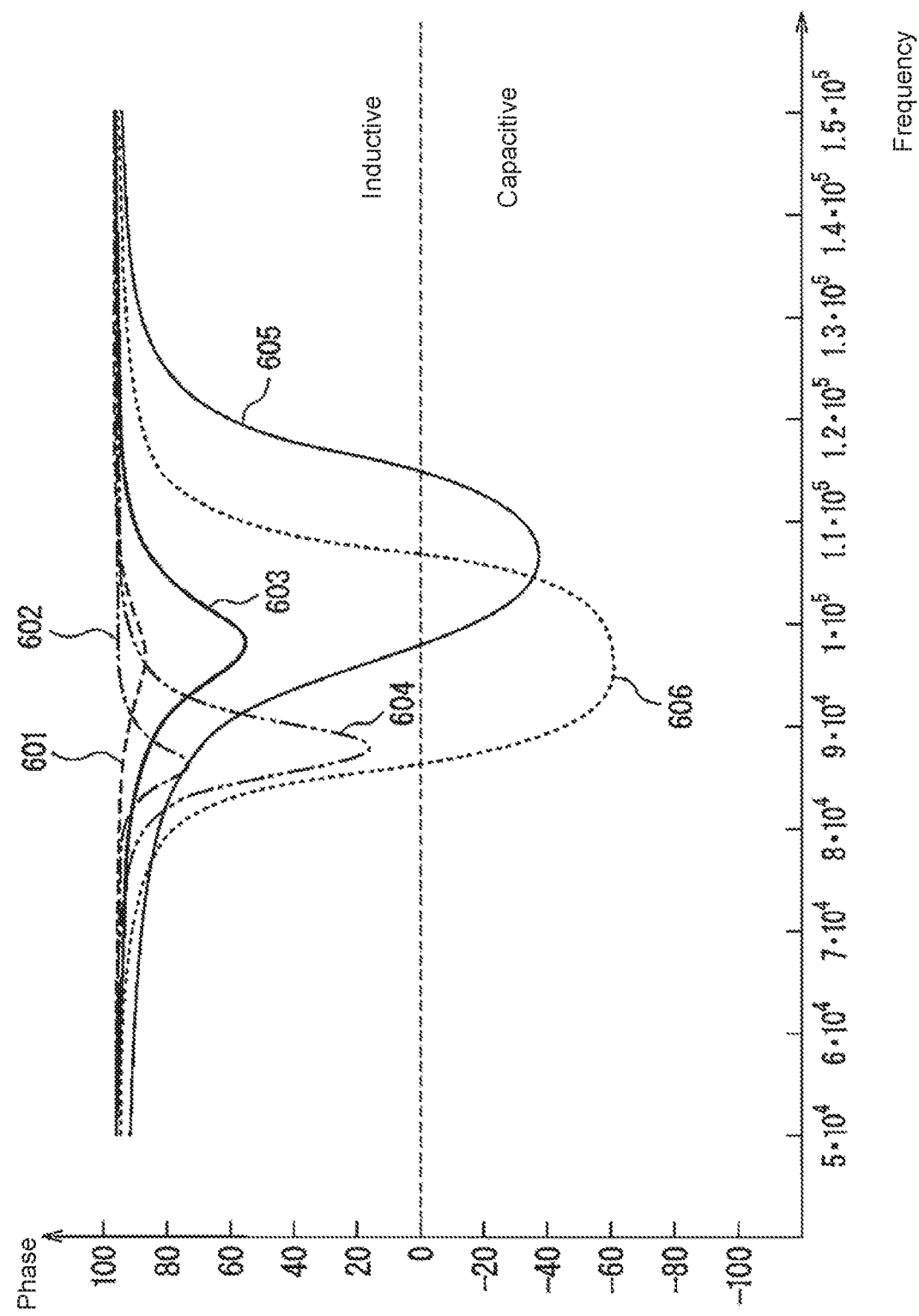
FIG. 6 is a graph showing the frequency response of a phase lag of a current relative to the voltage of alternating current (AC) power applied to the transmitter coil in the contactless power transmission apparatus according to the embodiment.

FIG. 6 is a graph showing the frequency response of a phase lag of a current relative to the voltage of the AC power applied to the transmitter coil 14 in the contactless power transmission apparatus 1 according to the embodiment. In FIG. 6, the horizontal axis represents the frequency, and the vertical axis represents the phase. In the graph, the phase with a positive value indicates that the phase of the current is delayed relative to the phase of the voltage. A line 601 represents the frequency response of the phase delay for the degree of coupling k=0.15 and the AC equivalent resistance of a load circuit being Rac. A line 602 represents the frequency response of the phase delay for the degree of coupling k=0.15 and the AC equivalent resistance of a load circuit being (10*Rac). A line 603 represents the frequency response of the phase delay for the degree of coupling k=0.3 and the AC equivalent resistance of a load circuit being Rac. A line 604 represents the frequency response of the phase delay for the degree of coupling k=0.3 and the AC equivalent resistance of a load circuit being (10*Rac). A line 605 represents the frequency response of the phase delay for the degree of coupling k=0.6 and the AC equivalent resistance of a load circuit being Rac. A line 606 represents the frequency response of the phase delay for the degree of coupling k=0.6 and the AC equivalent resistance of a load circuit being (10*Rac).

As indicated by the lines 601 to 606, the combinations of the degree of coupling and the frequency that enable a constant voltage output operation have phase lags with positive values within the frequency range including the frequencies corresponding to the plots 511 to 513 shown in FIG. 5 in which the contactless power transmission apparatus 1 outputs a constant voltage. Thus, the contactless power transmission apparatus 1 according to the present embodiment allows the power supply circuit 10 and the transmitter coil 14 to perform the soft-switching operation.

As described above, the contactless power transmission apparatus outputs power transmitted from the output coil located to be electromagnetically coupled to the receiver coil in the resonant circuit in the receiver. The contactless power transmission apparatus includes the output coil and the receiver coil with a larger number of turns than the output coil. Thus, the contactless power transmission apparatus can have a higher Q factor with a lower voltage of transmitted power. The contactless power transmission apparatus includes the transmitter that controls the switching frequency and the voltage of AC power applied to the transmitter coil to prevent loss in transmitted power. Thus, the contactless power transmission apparatus can improve power transmission efficiency while lowering the voltage of transmitted power. The contactless power transmission apparatus thus improves the power transmission efficiency also when supplying power to a load circuit for which a maximum applicable voltage is relatively low.

In one modification, a power supply circuit that supplies AC power to the transmitter coil 14 in the transmitter 2 may not have the circuit configuration described in the above embodiment, but may have another circuit configuration that can adjust the switching frequency and the voltage applied to the transmitter coil 14.

Figure 7:
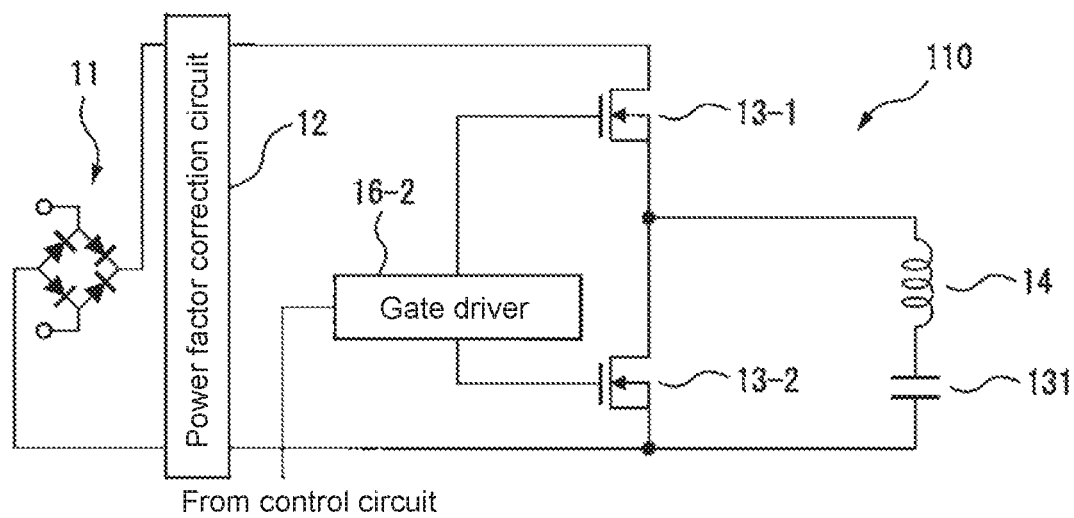
FIG. 7 is a circuit diagram of a power supply circuit according to a modification.

FIG. 7 is a circuit diagram of a power supply circuit according to a modification.

A power supply circuit 110 shown in FIG. 7 includes a power source 11, a power factor correction circuit 12, two switching elements 13-1 and 13-2, and a capacitor 131 connected in series to a transmitter coil 14 and functioning as a DC breaker. In the present modification as well, the switching elements 13-1 and 13-2 may be, for example, n-channel MOSFETs. The power factor correction circuit 12 is, for example, the same as the power factor correction circuit 12 in the above embodiment.

In the present modification, the switching elements 13-1 and 13-2 are connected in series between the positive electrode terminal and the negative electrode terminal of the power source 11. The power source 11 has the positive electrode connected to the switching element 13-1 and the negative electrode connected to the switching element 13-2. The switching element 13-1 has a drain terminal connected to the positive electrode terminal of the power source 11 through the power factor correction circuit 12 and a source terminal connected to the drain terminal of the switching element 13-2. The switching element 13-2 has a source terminal connected to the negative electrode terminal of the power source 11 through the power factor correction circuit 12. The source terminal of the switching element 13-1 and the drain terminal of the switching element 13-2 are connected to one end of the transmitter coil 14, and the source terminal of the switching element 13-2 is connected to the other end of the transmitter coil 14 through the capacitor 131. The switching elements 13-1 and 13-2 have their gate terminals connected to the gate driver 16-2.

In the present modification, the gate driver 16-2 may alternately turn on and off the switching elements 13-1 and 13-2 in accordance with the control signal from a control circuit. More specifically, when the switching element 13-1 is on and the switching element 13-2 is off, a current flows through the power factor correction circuit 12 and the switching element 13-1 from the power source 11 to the transmitter coil 14 to charge the capacitor 131. When the switching element 13-1 is off and the switching element 13-2 is on, the capacitor 131 discharges and allows a current to flow through the transmitter coil 14 and the switching element 13-2 from the capacitor 131. In the present modification, the control circuit may thus control the switching frequency for turning on and off the switching elements 13-1 and 13-2 with the gate driver 16-2 in accordance with the determination information received from the receiver 3.

In the above embodiment, a capacitor may be connected in series to the transmitter coil 14 to function as a DC breaker as in the power supply circuit 110. In this case as well, to prevent the transmitter coil 14 and the capacitor from operating as a resonant circuit in the adjustable switching frequency range, the capacitance of the capacitor may be set to allow the transmitter coil 14 and the capacitor to resonate at a frequency smaller than the resonance frequency of the resonant circuit 20 in the receiver 3 and smaller than the lower limit frequency in the adjustable switching frequency range.

The rectifier-smoothing circuit 25 in the above embodiment or modification may be a synchronous rectifier circuit that achieves full wave synchronous rectification and causes less loss.

Figure 8:
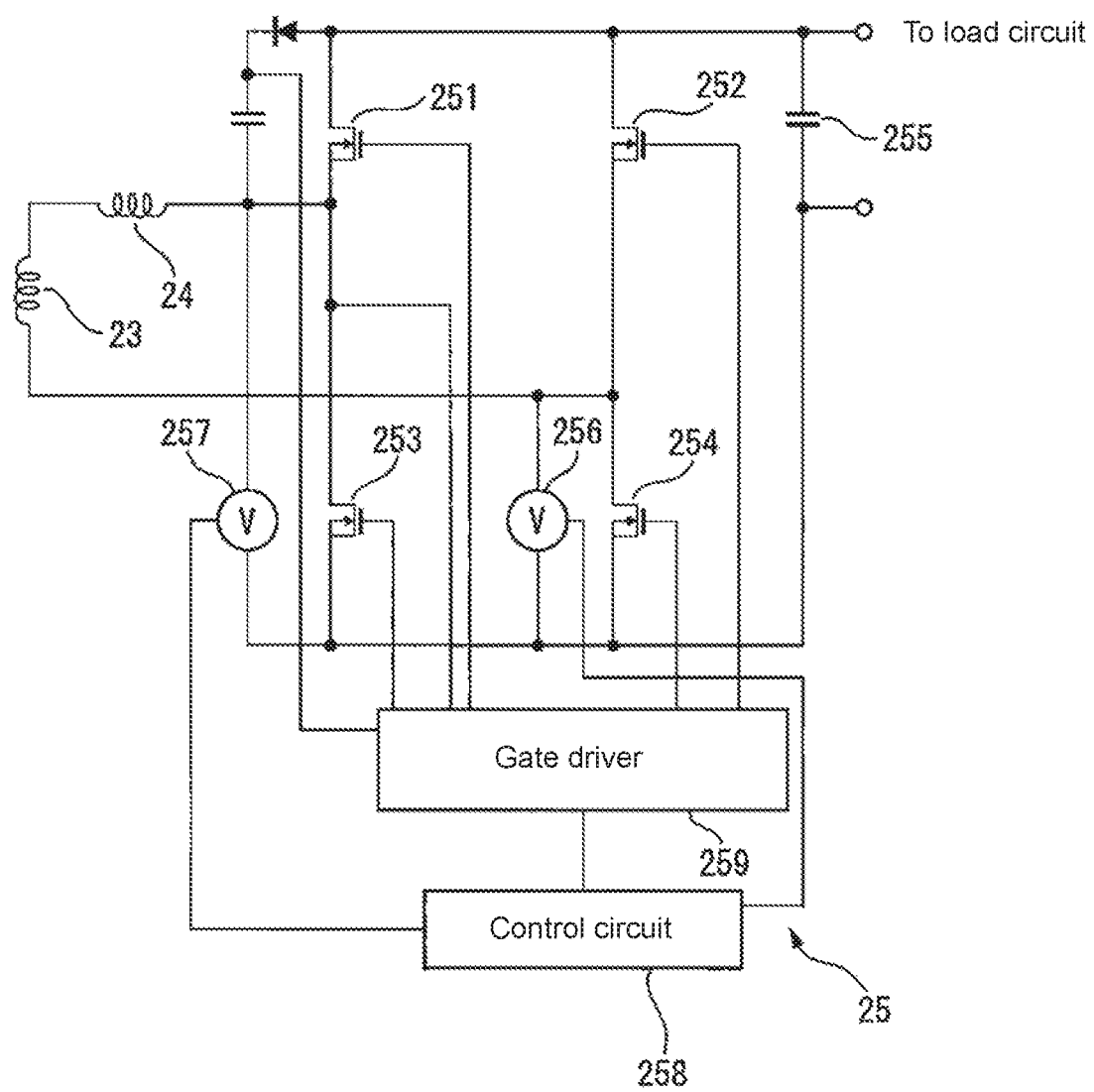
FIG. 8 is a schematic diagram of a rectifier-smoothing circuit in a receiver according to another modification.

FIG. 8 is a schematic diagram of a rectifier-smoothing circuit 25 in a receiver 3 according to another modification. The rectifier-smoothing circuit 25 according to the present modification includes four full-bridge-connected switching elements 251 to 254, a smoothing capacitor 255, two voltage detection circuits 256 and 257, a control circuit 258, and a gate driver 259.

The four switching elements 251 to 254 are, for example, n-channel MOSFETs. Of the four switching elements 251 to 254, the switching elements 251 and 252 are connected in series to each other and in parallel to the output coil 23. The switching element 251 has a source terminal connected to one end of the output coil 23 through the coil 24, and the switching element 252 has a source terminal connected to the other end of the output coil 23. The drain terminals of the switching elements 251 and 252 are connected to each other.

In the same manner, the switching elements 253 and 254 are connected in series to each other and in parallel to the switching elements 251 and 252. The switching element 253 has a drain terminal connected to one end of the output coil 23 through the coil 24, and the switching element 254 has a drain terminal connected to the other end of the output coil 23. The source terminals of the switching elements 253 and 254 are connected to each other.

The switching elements 251 to 254 have their gate terminals connected through the gate driver 259 to the control circuit 258. The switching elements 251 to 254 are turned on and off in accordance with the control signal from the control circuit 258. In the present modification, when one end of the output coil 23 connected to the coil 24 has a higher potential than the other end of the output coil 23 and a condition described below is satisfied, the switching elements 251 and 254 are turned on, and the switching elements 252 and 253 are turned off. When the end of the output coil 23 connected to coil 24 has a lower potential than the other end of the output coil 23 and the condition described below is satisfied, the switching elements 251 and 254 are turned off, and the switching elements 252 and 253 are turned on. Thus, the AC power supplied from the output coil 23 is converted to a DC pulsating voltage, synchronously rectified, and smoothed by the smoothing capacitor 255 before being supplied to the load circuit 28.

The voltage detection circuit 256 measures the voltage between the source and the drain of the switching element 254 and outputs the measurement value to the control circuit 258. Similarly, the voltage detection circuit 257 measures the voltage between the source and the drain of the switching element 253 and outputs the measurement value to the control circuit 258. The voltage detection circuits 256 and 257 may each be any circuit that determines the measurement value of the voltage between the source and the drain of the corresponding switching element.

The control circuit 258 controls the on-off states of the switching elements 251 to 254 to allow the synchronous rectification of the rectifier-smoothing circuit 25. For example, the control circuit 258 includes a comparator circuit for comparing the measurement value of a voltage with a predetermined reference value and a control circuit for controlling the switching elements 251 to 254 with the gate driver 259. The control circuit 258 may control the on-off states of the switching elements 251 to 254 in a manner similar to the synchronous rectification at the secondary end of an LLC resonance converter. For example, the voltage detected by the voltage detection circuit 256 between the source and the drain of the switching element 254 decreases to less than or equal to the predetermined reference value when a current starts flowing through a body diode in the switching element 254. This causes the control circuit 258 to output a control signal for turning on the switching elements 251 and 254 to the gate driver 259. In response to the control signal, the gate driver 259 turns on the switching elements 251 and 254. When the voltage detected by the voltage detection circuit 256 between the source and the drain of the switching element 254 exceeds the predetermined reference value, the control circuit 258 outputs, to the gate driver 259, a control signal for turning off the switching elements 251 and 254. In response to the control signal, the gate driver 259 turns off the switching elements 251 and 254. Similarly, the voltage detected by the voltage detection circuit 257 between the source and the drain of the switching element 253 decreases to less than or equal to the predetermined reference value when a current starts flowing through a body diode in the switching element 253. This causes the control circuit 258 to output a control signal for turning on the switching elements 252 and 253 to the gate driver 259. In response to the control signal, the gate driver 259 turns on the switching elements 252 and 253. When the voltage detected by the voltage detection circuit 257 between the source and the drain of the switching element 253 exceeds the predetermined reference value, the control circuit 258 outputs a control signal for turning off the switching elements 252 and 253 to the gate driver 259. In response to the control signal, the gate driver 259 turns off the switching elements 252 and 253. The rectifier-smoothing circuit 25 thus performs synchronous rectification and reduces loss due to a current flowing through the rectifier-smoothing circuit 25.

The inventors have also noticed that the contactless power transmission apparatus according to the above embodiment has a minimum input impedance at the frequency at which the contactless power transmission apparatus outputs a constant voltage when the load circuit in the receiver has a preset resistance.

Figure 9:
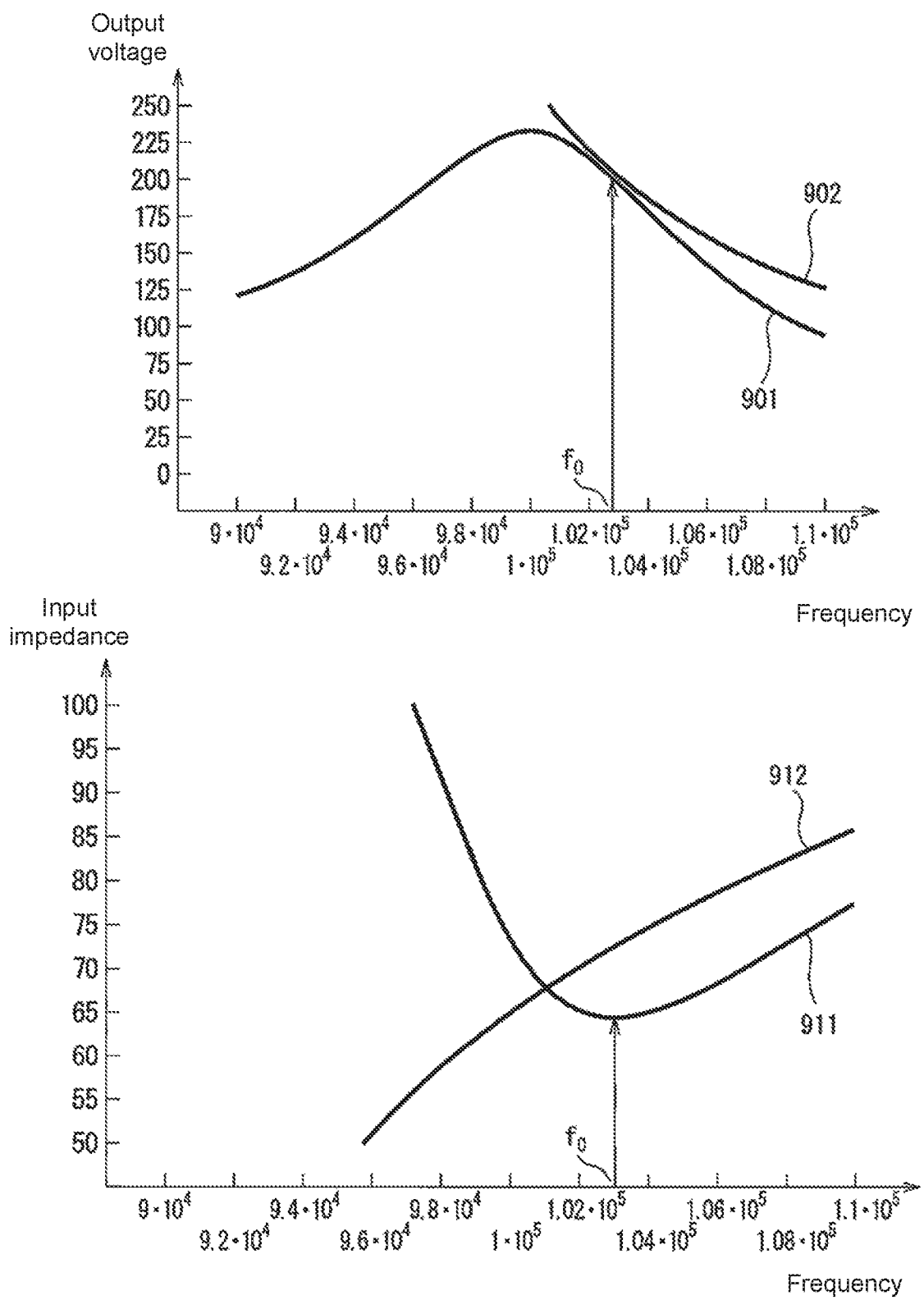
FIG. 9 includes graphs showing an example relationship between the frequency response of the output voltage and the frequency response of the input impedance in the contactless power transmission apparatus.

FIG. 9 includes graphs showing an example relationship between the frequency response of the output voltage and the frequency response of the input impedance in the contactless power transmission apparatus. In the upper graph in FIG. 9, the horizontal axis represents the frequency, and the vertical axis represents the output voltage. In the lower graph in FIG. 9, the horizontal axis represents the frequency, and the vertical axis represents the input impedance. In the simulation, the same parameter values as for the circuit elements used in the simulation shown in FIG. 4 are used. In the upper graph, a line 901 (identical to the line 403 in FIG. 4) represents the frequency response of the output voltage from the contactless power transmission apparatus 1 for the degree of coupling k=0.3 and the AC equivalent resistance of the load circuit 28 being Rac. A line 902 (identical to the line 404 in FIG. 4) represents the frequency response of the output voltage from the contactless power transmission apparatus 1 for the degree of coupling k=0.3 and the AC equivalent resistance of the load circuit 28 being (10*Rac). In the lower graph, a line 911 represents the frequency response of the input impedance of the contactless power transmission apparatus 1 for the degree of coupling k=0.3 and the AC equivalent resistance of the load circuit 28 being Rac. A line 912 represents the frequency response of the input impedance of the contactless power transmission apparatus 1 for the degree of coupling k=0.3 and the AC equivalent resistance of the load circuit 28 being (100*Rac).

As shown in FIG. 9, the input impedance reaches the minimum at the frequency f0 at which the contactless power transmission apparatus 1 outputs a constant voltage when the AC equivalent resistance of the load circuit 28 is Rac. In other words, the current through the transmitter coil 14 reaches the maximum at the frequency f0.

A control circuit in a transmitter according to one modification may determine whether a contactless power transmission apparatus outputs a constant voltage in accordance with the frequency response of a current flowing through a transmitter coil.

Figure 10:
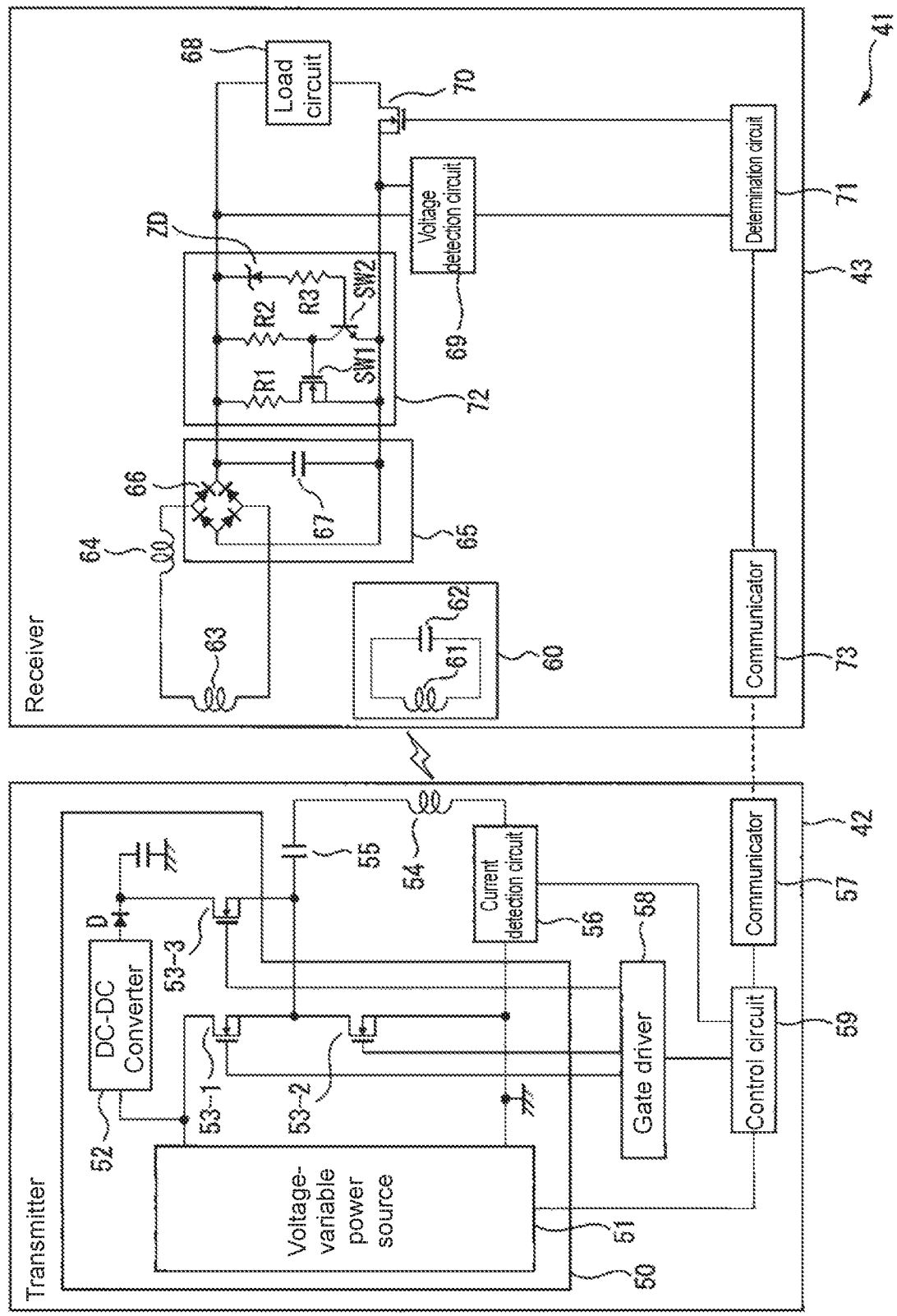
FIG. 10 is a schematic diagram of a contactless power transmission apparatus according to still another modification.

FIG. 10 is a schematic diagram of the contactless power transmission apparatus according to the modification. As shown in FIG. 10, a contactless power transmission apparatus 41 includes a transmitter 42, and a receiver 43 for receiving power through space from the transmitter 42 in a contactless manner. The transmitter 42 includes a power supply circuit 50, a transmitter coil 54, a capacitor 55, a current detection circuit 56, a communicator 57, a gate driver 58, and a control circuit 59. The receiver 43 includes a resonant circuit 60 including a receiver coil 61 and a resonant capacitor 62, an output coil 63, a coil 64, a rectifier-smoothing circuit 65 including a full wave rectifier circuit 66 and a smoothing capacitor 67, a load circuit 68, a voltage detection circuit 69, a switching element 70, a determination circuit 71, a fixed load circuit 72, and a communicator 73.

The contactless power transmission apparatus 41 differs from the contactless power transmission apparatus 1 shown in FIG. 1 in that the transmitter 42 includes the power supply circuit 50 with a different structure, the capacitor 55, the current detection circuit 56, the single gate driver 58, and the control circuit 59 that performs partially different control and in that the receiver 43 includes the fixed load circuit 72. The above differences and associated structures will now be described below. For the details of the other components of the contactless power transmission apparatus 41, the corresponding components are described in the above embodiment.

The power supply circuit 50 supplies AC power having an adjustable switching frequency and an adjustable voltage to the transmitter coil 54. The power supply circuit 50 thus includes a voltage-variable power source 51, a DC-DC converter 52, and three switching elements 53-1 to 53-3.

The voltage-variable power source 51 supplies DC power having a voltage adjustable by the control circuit 59. The voltage-variable power source 51 may include any one of circuit designs enabling adjustment of supplying voltage. While the contactless power transmission apparatus 41 is outputting a constant voltage, the DC power supplied from the voltage-variable power source 51 is converted into AC power through the switching elements 53-1 and 53-2 before being supplied to the transmitter coil 54. While the switching frequency is being adjusted to enable the contactless power transmission apparatus 41 to output a constant voltage, the DC power supplied from the voltage-variable power source 51 is supplied to the transmitter coil 54 through the DC-DC converter 52 and the switching element 53-3.

The DC-DC converter 52 has an input terminal connected to a positive electrode terminal of the voltage-variable power source 51 and an output terminal connected to one end of the capacitor 55 through a diode D and the switching element 53-3. The DC-DC converter 52 lowers the voltage of the DC power supplied from the voltage-variable power source 51 to a predetermined voltage (e.g., 5 V).

While the switching frequency is being adjusted to enable the contactless power transmission apparatus 41 to output a constant voltage, the voltage output from the DC-DC converter 52 is supplied to the transmitter coil 54 through the diode D, the switching element 53-3, and the capacitor 55.

The switching elements 53-1 to 53-3 are, for example, n-channel MOSFETs. The switching elements 53-1 and 53-2 are connected in series between the positive electrode terminal and the negative electrode terminal of the voltage-variable power source 51. The voltage-variable power source 51 has a positive electrode end connected to the switching element 53-1 and a negative electrode end connected to the switching element 53-2. The switching element 53-1 has a drain terminal connected to the positive electrode terminal of the voltage-variable power source 51 and a source terminal connected to the drain terminal of the switching element 53-2. The source terminal of the switching element 53-1 and the drain terminal of the switching element 53-2 are connected to one end of the transmitter coil 54 through the capacitor 55. The source terminal of the switching element 53-2 is connected to the negative electrode terminal of the voltage-variable power source 51 and to the other end of the transmitter coil 54 through the current detection circuit 56.

The switching element 53-3 has a drain terminal connected to the output terminal of the DC-DC converter 52 and a source terminal connected to one end of the transmitter coil 54 through the capacitor 55. The switching elements 53-1 to 53-3 have their gate terminals connected to the gate driver 58.

While the contactless power transmission apparatus 41 is outputting a constant voltage, the gate driver 58 retains the off state of the switching element 53-3 in accordance with a control signal from the control circuit 59. The gate driver 58 also alternately turns on and off the switching elements 53-1 and 53-2 at the switching frequency at which a constant voltage is output in accordance with the control signal from the control circuit 59. More specifically, when the switching element 53-1 is on and the switching element 53-2 is off, a current flows through the transmitter coil 54 as the capacitor 55 charges the power supplied from the voltage-variable power source 51 through the switching element 53-1. When the switching element 53-1 is off and the switching element 53-2 is on, the capacitor 55 discharges and causes a current to flow through the transmitter coil 54.

While the switching frequency is being adjusted to enable the contactless power transmission apparatus 41 to output a constant voltage, the gate driver 58 retains the off state of the switching element 53-1 and alternately turns on and off the switching elements 53-3 and 53-2 at the switching frequency in accordance with the control signal from the control circuit 59.

The capacitor 55 is connected between the transmitter coil 54 and the power supply circuit 50. The capacitor 55 repeatedly charges and discharges in response to each switching element being turned on and off at the switching frequency, and supplies AC power having the switching frequency to the transmitter coil 54. To prevent the transmitter coil 54 and the capacitor 55 from operating as a resonant circuit in the adjustable switching frequency range, the capacitance of the capacitor 55 may be set to allow the transmitter coil 54 and the capacitor 55 to resonate at a frequency smaller than the resonance frequency of the resonant circuit 60 in the receiver 43 and smaller than the lower limit of the adjustable switching frequency range.

The current detection circuit 56 is connected between the transmitter coil 54 and the power supply circuit 50 to measure the current through the transmitter coil 54. The current detection circuit 56 outputs the measurement value of the current to the control circuit 59. The current detection circuit 56 may be connected in parallel to the capacitor 55 to the transmitter coil 54 together with a diverting capacitor (not shown) connected in series to the current detection circuit 56. In this case, the current detection circuit 56 indirectly measures the current through the transmitter coil 54.

The determination circuit 71 in the receiver 43 turns on the switching element 70 to allow the output voltage received through the resonant circuit 60 and output from the output coil 63 to be supplied through the rectifier-smoothing circuit 65 to the load circuit 68 while the measurement value of the output voltage from the output coil 63 detected by the voltage detection circuit 69 is retained within the predetermined range of voltages and thus the contactless power transmission apparatus 41 is outputting a constant voltage. While the measurement value of the output voltage is out of the allowable range of voltages, the determination circuit 71 turns off the switching element 70 to prevent the output voltage from the output coil 63 from being supplied to the load circuit 68.

The fixed load circuit 72 is connected in parallel to the load circuit 68 to the rectifier-smoothing circuit 65 and provides a load substantially equal to a reference load of the load circuit 68 (e.g., Rac in the simulation shown in FIG. 9) to the receiver 43 while the switching frequency is being adjusted. The fixed load circuit 72 is thus connected in parallel to the load circuit 68 to the rectifier-smoothing circuit 65 and includes a resistor R1 having a resistance corresponding to the reference load of the load circuit 68. The resistor R1 is connected in series to a switching element SW1 such as an n-channel MOSFET. The fixed load circuit 72 also includes a resistor R2 and a switching element SW2 such as a negative-positive-negative (NPN) bipolar transistor that are connected in series in this order from the positive electrode between the output terminals of the rectifier-smoothing circuit 65. The resistor R2 and the switching element SW2 are connected in parallel to the resistor R1. The switching element SW1 has a gate terminal connected between the resistor R2 and one end of the switching element SW2 (the collector terminal in this example). The switching element SW2 has a base terminal connected to the positive electrode terminal of the rectifier-smoothing circuit 65 through a resistor R3 and an inversely biased Zener diode ZD.

While the contactless power transmission apparatus 41 is outputting a constant voltage, the output voltage from the output coil 63 is higher than the breakdown voltage of the Zener diode ZD, and thus the switching element SW2 receives a current at the base terminal through the Zener diode ZD and the resistor R3 and is turned on. This lowers the voltage applied to the gate terminal of the switching element SW1, turning off the switching element SW1. Thus, the resistor R1 receives no output voltage from the output coil 63.

While the switching frequency is being adjusted to enable the contactless power transmission apparatus 41 to output a constant voltage, the voltage of power supplied from the DC-DC converter 52 to the transmitter coil 54 is low, and thus the power supplied from the transmitter 42 to the receiver 43 is also low. Thus, the output voltage from the output coil 63 decreases to be lower than the breakdown voltage of the Zener diode ZD. This turns off the switching element SW2, and increases the voltage applied to the gate terminal of the switching element SW1 and turns on the switching element SW1. Thus, the resistor R1 receives the output voltage from the output coil 63. The fixed load of the resistor R1 is thus provided to the receiver 43.

The operation of the control circuit 59 in the transmitter 42 according to the present modification will be described below. While the contactless power transmission apparatus 41 is outputting a constant voltage, as in the above embodiment, the control circuit 59 controls the voltage-variable power source 51 in the power supply circuit 50 to supply a DC voltage having a voltage value corresponding to the switching frequency to the transmitter coil 54 and regulates the measurement value of the output voltage from the output coil 63 in the receiver 43 to be within a predetermined allowable range. The control circuit 59 also retains, through the gate driver 58, the off state of the switching element 53-3, and turns on and off the switching elements 53-1 and 53-2 at the switching frequency at which a constant voltage is output.

When the determination information included in the radio signal received from the receiver 43 through the communicator 57 indicates that the contactless power transmission apparatus 41 is not outputting a constant voltage, the control circuit 59 retains, through the gate driver 58, the off state of the switching element 53-1, and alternately turns on and off the switching elements 53-3 and 53-2. This supplies power to the transmitter coil 54 through the DC-DC converter 52.

The control circuit 59 controls the voltage-variable power source 51 to supply a voltage with a predetermined value to the transmitter coil 54 through the DC-DC converter 52. The control circuit 59 reduces the power supplied from the transmitter 42 to the receiver 43 to apply voltage to the resistor R1 in the fixed load circuit 72 in the receiver 43.

The control circuit 59 then monitors, while varying the switching frequency, the measurement value of the current through the transmitter coil 54 using the current detection circuit 56, and detects the switching frequency at which the measurement current value reaches the maximum. The switching frequency at which the measurement value of the current through the transmitter coil 54 reaches the maximum is the frequency at which the input impedance of the contactless power transmission apparatus 41 reaches the minimum such as the frequency f0 shown in FIG. 9, or in other words, the frequency at which the contactless power transmission apparatus 41 outputs a constant voltage. Upon detecting the switching frequency at which the measurement value of the current through the transmitter coil 54 reaches the maximum, the control circuit 59 controls the on-off states of the switching elements 53-1 and 53-2 through the gate driver 58 to supply power from the voltage-variable power source 51 to the transmitter coil 54 at the switching frequency. The control circuit 59 turns off the switching element 53-3. In the manner described above, the control circuit 59 enables the contactless power transmission apparatus 41 to output a constant voltage. As described above, the control circuit 59 controls the voltage-variable power source 51 in the power supply circuit 50 to supply a DC voltage having a voltage value corresponding to the switching frequency to the transmitter coil 54, and regulates the measurement value of the output voltage from the output coil 63 in the receiver 43 to be within the predetermined allowable range.

In the present modification, the control circuit in the transmitter monitors a current flowing through the transmitter coil in the transmitter to detect the switching frequency at which the contactless power transmission apparatus outputs a constant voltage. As in the above embodiment, the contactless power transmission apparatus according to the present modification improves power transmission efficiency while lowering the voltage of transmitted power. The contactless power transmission apparatus thus improves the power transmission efficiency also when supplying power to a load circuit for which a maximum applicable voltage is relatively low.

In this modification as well, the rectifier-smoothing circuit 65 in the receiver 43 may be a synchronous rectifier circuit shown in FIG. 8.

As described above, those skilled in the art can make various changes in accordance with embodiments implemented within the scope of the present invention.

The invention claimed is:

1. A contactless power transmission apparatus, comprising:
    a transmitter; and
    a receiver configured to receive electric power from the transmitter in a contactless manner, wherein
    the transmitter comprises
        a transmitter coil configured to supply electric power to the receiver,
        a power supply circuit configured to supply alternating current power to the transmitter coil and adjust a switching frequency and a voltage of the alternating current power to be supplied to the transmitter coil, a first communicator configured to receive, from the receiver, determination information indicating whether the contactless power transmission apparatus is outputting a constant voltage, and a control circuit configured to control the switching frequency and the voltage of the alternating current power to be supplied to the transmitter coil from the power supply circuit in accordance with the determination information, and the receiver comprises a resonant circuit including a receiver coil configured to receive electric power from the transmitter and a resonant capacitor connected in parallel to the receiver coil, an output coil located to be electromagnetically coupled to the receiver coil and having fewer turns than the receiver coil, a rectifier circuit configured to rectify electric power received through the receiver coil and output from the output coil, a coil connected between the output coil and the rectifier circuit, a voltage detection circuit configured to measure an output voltage of electric power output from the rectifier circuit and determine a measurement value of the output voltage, a second communicator configured to communicate with the first communicator, and a determination circuit configured to determine whether the contactless power transmission apparatus is outputting a constant voltage in accordance with the measurement value of the output voltage and cause the second communicator to transmit a signal including the determination information.

2. The contactless power transmission apparatus according to claim 1, wherein the rectifier circuit comprises a synchronous rectifier circuit.

\* \* \* \* \*